United States Patent
Hayes et al.

(10) Patent No.: US 10,489,256 B2
(45) Date of Patent: *Nov. 26, 2019

(54) DISASTER RECOVERY AT HIGH RELIABILITY IN A STORAGE CLUSTER

(71) Applicant: Pure Storage, Inc., Mountain View, CA (US)

(72) Inventors: John Hayes, Mountain View, CA (US); Par Botes, Mountain View, CA (US)

(73) Assignee: Pure Storage, Inc., Mountain View, CA (US)

( * ) Notice: Subject to any disclaimer, the term of this patent is extended or adjusted under 35 U.S.C. 154(b) by 29 days.

This patent is subject to a terminal disclaimer.

(21) Appl. No.: 15/315,678

(22) PCT Filed: Jun. 4, 2015

(86) PCT No.: PCT/US2015/034278
§ 371 (c)(1),
(2) Date: Dec. 1, 2016

(87) PCT Pub. No.: WO2015/187996
PCT Pub. Date: Oct. 12, 2015

(65) Prior Publication Data
US 2017/0116100 A1 Apr. 27, 2017

Related U.S. Application Data

(63) Continuation of application No. 14/296,155, filed on Jun. 4, 2014, now Pat. No. 9,087,012.

(51) Int. Cl.
*G06F 11/20* (2006.01)
*G06F 11/14* (2006.01)
(Continued)

(52) U.S. Cl.
CPC .......... *G06F 11/2094* (2013.01); *G06F 3/065* (2013.01); *G06F 3/0619* (2013.01);
(Continued)

(58) Field of Classification Search
CPC ............. G06F 11/1446; G06F 11/1448; G06F 11/1458; G06F 11/1464; G06F 11/1469;
(Continued)

(56) References Cited

U.S. PATENT DOCUMENTS 6,598,134 B2  7/2003  Ofek
6,725,392 B1  4/2004  Frey et al.
(Continued)

OTHER PUBLICATIONS

"Clustered file system", Jan. 30, 2014, Wikipedia, pp. 1-5. (Year: 2014).*
(Continued)

*Primary Examiner* — Gabriel Chu
(74) *Attorney, Agent, or Firm* — Womble Bond Dickinson (US) LLP

(57) ABSTRACT

A storage grid is provided. The storage grid includes a first cluster, a second cluster, and a third cluster. Each of the first cluster, the second cluster and the third cluster is configured to store an amount of data ranging from a portion of a copy of the data to a full copy of the data. The first cluster has a full copy of data written to the first cluster and at least a partial copy of data written to the second and third cluster. The second cluster has a full copy of data written to the second cluster, and at least a partial copy of the data written to the first and third cluster. The third cluster has a full copy of data written to the third cluster and at least a partial copy of the data written to the first and second cluster. A method of storing data is also provided.

20 Claims, 9 Drawing Sheets

(51) Int. Cl.
*H04L 29/08* (2006.01)
*G06F 21/62* (2013.01)
*H04L 9/08* (2006.01)
*G06F 3/06* (2006.01)
*G06F 21/60* (2013.01)

(52) U.S. Cl.
CPC ........ *G06F 11/1458* (2013.01); *G06F 21/602* (2013.01); *G06F 21/6272* (2013.01); *H04L 9/085* (2013.01); *H04L 67/1095* (2013.01); *G06F 2201/84* (2013.01)

(58) Field of Classification Search
CPC .............. G06F 11/2056; G06F 11/2089; G06F 11/2094; G06F 2211/1011; G06F 2211/1028; Y10S 707/99955; H04L 67/104; H04L 67/1095; H04L 9/085
See application file for complete search history.

(56) References Cited

U.S. PATENT DOCUMENTS

| | | | |
|---|---|---|---|
| 6,922,761 B2 | 7/2005 | Oconnell et al. | |
| 7,072,914 B2 | 7/2006 | Cabrera et al. | |
| 7,130,954 B2 | 10/2006 | Obara | |
| 7,206,836 B2 | 4/2007 | Dinker et al. | |
| 7,313,579 B2 | 12/2007 | Murotani | |
| 7,330,997 B1 * | 2/2008 | Odom | G06F 11/1464 711/162 |
| 7,403,946 B1 | 7/2008 | Taylor | |
| 7,546,342 B2 | 6/2009 | Li et al. | |
| 7,581,135 B2 | 8/2009 | Augenstein et al. | |
| 7,640,408 B1 | 12/2009 | Halligan et al. | |
| 7,751,407 B1 | 7/2010 | Don et al. | |
| 7,765,189 B2 | 7/2010 | Yamakawa | |
| 7,778,960 B1 | 8/2010 | Chatterjee et al. | |
| 7,908,448 B1 | 3/2011 | Chatterjee et al. | |
| 8,010,485 B1 | 8/2011 | Chatterjee et al. | |
| 8,010,756 B1 | 8/2011 | Linde | |
| 8,010,829 B1 | 8/2011 | Chatterjee et al. | |
| 8,028,110 B1 | 9/2011 | Wigmore | |
| 8,046,548 B1 | 10/2011 | Chatterjee et al. | |
| 8,086,911 B1 | 12/2011 | Taylor | |
| 8,131,682 B2 | 3/2012 | Kitamura | |
| 8,145,838 B1 | 3/2012 | Miller et al. | |
| 8,244,999 B1 | 8/2012 | Chatterjee et al. | |
| 8,255,773 B2 | 8/2012 | Dabreu et al. | |
| 8,271,548 B2 | 9/2012 | Prahlad | |
| 8,327,080 B1 | 12/2012 | Der | |
| 8,335,933 B2 | 12/2012 | Humphrey et al. | |
| 8,341,460 B2 | 12/2012 | Desai | |
| 8,442,957 B2 | 5/2013 | Saake et al. | |
| 8,457,317 B2 | 6/2013 | Shaw | |
| 8,478,893 B2 | 7/2013 | Hiie | |
| 8,479,037 B1 | 7/2013 | Chatterjee et al. | |
| 8,498,967 B1 | 7/2013 | Chatterjee et al. | |
| 8,522,073 B2 | 8/2013 | Cohen | |
| 8,595,455 B2 | 11/2013 | Chatterjee et al. | |
| 8,601,600 B1 | 12/2013 | Shankar et al. | |
| 8,627,136 B2 | 1/2014 | Shankar et al. | |
| 8,656,189 B2 | 2/2014 | Orsini et al. | |
| 8,667,189 B2 | 3/2014 | Lu et al. | |
| 8,700,875 B1 | 4/2014 | Barron et al. | |
| 8,744,071 B2 | 6/2014 | Leggette et al. | |
| 8,745,415 B2 | 6/2014 | Miller et al. | |
| 8,751,878 B1 | 6/2014 | Don | |
| 8,819,374 B1 | 8/2014 | Don | |
| 8,838,961 B2 | 9/2014 | Zarfoss et al. | |
| 8,914,669 B2 | 12/2014 | Dhuse et al. | |
| 8,924,425 B1 | 12/2014 | Pandey et al. | |
| 9,063,896 B1 | 6/2015 | Madnani | |
| 9,083,724 B2 | 7/2015 | Kamawat | |
| 9,098,211 B1 | 8/2015 | Madnani | |
| 9,098,718 B2 | 8/2015 | Ohare et al. | |
| 9,143,485 B2 | 9/2015 | Shaw | |
| 2005/0083862 A1 | 4/2005 | Kongalath | |
| 2005/0154849 A1 | 7/2005 | Watanabe | |
| 2006/0221721 A1 | 10/2006 | Tanaka et al. | |
| 2007/0014403 A1 | 1/2007 | Loo et al. | |
| 2008/0140966 A1 | 6/2008 | Deguchi et al. | |
| 2008/0295118 A1 | 11/2008 | Liao | |
| 2009/0259817 A1 | 10/2009 | Sharma | |
| 2010/0268908 A1 | 10/2010 | Ouyang et al. | |
| 2012/0221787 A1 | 8/2012 | Fuente et al. | |
| 2012/0278553 A1 | 11/2012 | Mudhiganti et al. | |
| 2013/0060884 A1 | 3/2013 | Bembo et al. | |
| 2013/0073894 A1 | 3/2013 | Xavier et al. | |
| 2013/0297899 A1 | 11/2013 | Kawaguchi | |
| 2014/0044259 A1 | 2/2014 | Funayama | |
| 2014/0047263 A1 | 2/2014 | Coatney et al. | |
| 2014/0108470 A1 | 4/2014 | Lad | |
| 2014/0136880 A1 | 5/2014 | Shankar et al. | |
| 2014/0195636 A1 | 7/2014 | Karve et al. | |
| 2015/0254257 A1 | 11/2015 | Kritchko et al. | |
| 2016/0110380 A1 | 4/2016 | Powell | |

OTHER PUBLICATIONS

Shamir, "How to Share a Secret", Nov. 1979, Acm, Communications of the ACM, vol. 22, No. 11.

"Data Striping", Feb. 2012, Wikipedia.

Storer, Mark W., et al., "Pergamum: Replacing Tape with Energy Efficient, Reliable, Disk-Based Archival Storage." Fast '08: 6th USENIX Conference on File and Storage Technologies, San Jose, CA, Feb. 26-29, 2008, pp. 1-16.

Hwang, Kai, et al., "RAID-x: A New Distributed Disk Array for I/O-Centric Cluster Computing," HPDC '00 Proceedings of the 9th IEEE International Symposium on High Performance Distributed Computing, IEEE, 2000, pp. 279-286.

\* cited by examiner

DISASTER RECOVERY AT HIGH RELIABILITY IN A STORAGE CLUSTER

BACKGROUND

Solid-state memory, such as flash, is currently in use in solid-state drives (SSD) to augment or replace conventional hard disk drives (HDD), writable CD (compact disk) or writable DVD (digital versatile disk) drives, collectively known as spinning media, and tape drives, for storage of large amounts of data. Flash and other solid-state memories have characteristics that differ from spinning media. Yet, many solid-state drives are designed to conform to hard disk drive standards for compatibility reasons, which makes it difficult to provide enhanced features or take advantage of unique aspects of flash and other solid-state memory. Storage systems, whether applying solid-state memory such as flash, or hard disk drives, or hybrid combinations of the two, are vulnerable to disasters such as multiple component failures, system power loss, data theft and physical theft (i.e., loss of both components and data). In addition, conventional storage architectures may allow for exposure of the data in the case of physical theft of a storage module.

It is within this context that the embodiments arise.

SUMMARY

In some embodiments, a storage grid is provided. The storage grid includes a first cluster, a second cluster, and a third cluster. Each of the first cluster, the second cluster and the third cluster is configured to store an amount of data ranging from a portion of a copy of the data to a full copy of the data. The first cluster has a full copy of data written to the first cluster and at least a partial copy of data written to the second and third cluster. The second cluster has a full copy of data written to the second cluster, and at least a partial copy of the data written to the first and third cluster. The third cluster has a full copy of data written to the third cluster and at least a partial copy of the data written to the first and second cluster.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
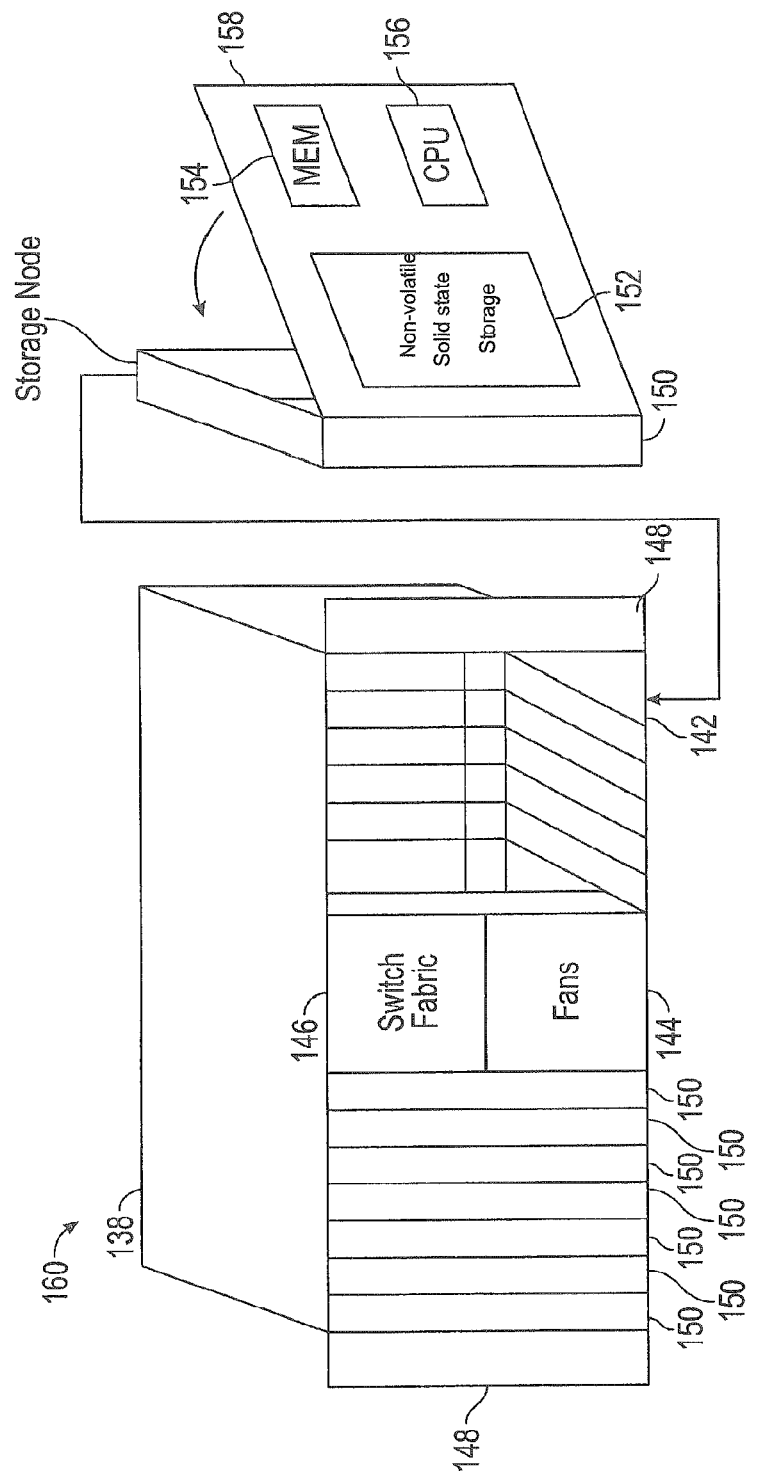
FIG. 1 is a perspective view of a storage cluster with multiple storage nodes and internal storage coupled to each storage node to provide network attached storage, in accordance with some embodiments.

The embodiments below describe a storage grid. The storage grid includes storage clusters and each of the storage clusters may include non-volatile solid state storage units that are arranged for survivability and decreased vulnerability. The storage clusters are not limited to the use of non-volatile solid state storage as any suitable storage class medium including volatile storage, non-volatile storage, solid state storage, disk drives, or any combinations of storage class medium, may be integrated into the storage clusters. In one arrangement, three storage clusters are provided in the storage grid with each storage cluster storing a full copy of data or a portion of the data. After a period of time and multiple data writes, e.g., in a steady-state, no one storage cluster has a copy of all of the data that has been written to the storage clusters of the storage grid. Thus, the system is not vulnerable to theft of any one storage cluster or an unrecoverable loss of any one storage cluster of the storage grid. Any two of the storage clusters in combination can recover all of the data that has been written to the storage grid so that the system is able to survive a failure of any one of the storage clusters. That is, there exists two full copies of the data are distributed within the storage grid. Two storage clusters of the storage grid can always recreate the data either by any one of the storage clusters having a full copy of the data or by two of the storage clusters having portions of the data arranged so that the recovery of the portions of the data yields the full copy of the data. The embodiments are not limited to three storage clusters within a storage grid as three or more independent storage clusters may be coupled together as a storage grid. In addition, the portions of the copy of the data may be distributed over two or more storage clusters.

The storage clusters store user data, such as user data originating from one or more user or client systems or other sources external to the storage cluster. The storage cluster distributes user data across storage nodes housed within a chassis, using erasure coding and redundant copies of metadata. Erasure coding refers to a method of data protection or reconstruction in which data is stored across a set of different locations, such as disks, storage nodes or geographic locations. Flash memory is one type of solid-state memory that may be integrated with the embodiments, although the embodiments may be extended to other types of solid-state memory or other storage medium, including non-solid state memory. Control of storage locations and workloads are distributed across the storage locations in a clustered peer-to-peer system. Tasks such as mediating communications between the various storage nodes, detecting when a storage node has become unavailable, and balancing I/Os (inputs and outputs) across the various storage nodes, are all handled on a distributed basis. Data is laid out or distributed across multiple storage nodes in data fragments or stripes that support data recovery in some embodiments. Ownership of data can be reassigned within a cluster, independent of input and output patterns. This architecture described in more detail below allows a storage node in the cluster to fail, with the system remaining operational, since the data can be reconstructed from other storage nodes and thus remain available for input and output operations. In various embodiments, a storage node may be referred to as a cluster node, a blade, or a server.

The storage cluster is contained within a chassis, i.e., an enclosure housing one or more storage nodes. A mechanism to provide power to each storage node, such as a power distribution bus, and a communication mechanism, such as a communication bus that enables communication between the storage nodes are included within the chassis. The storage cluster can run as an independent system in one location according to some embodiments. In one embodiment, a chassis contains at least two instances of both the power distribution and the communication bus which may be enabled or disabled independently. The internal communication bus may be an Ethernet bus, however, other technologies such as Peripheral Component Interconnect (PCI) Express, InfiniBand, and others, are equally suitable. The chassis provides a port for an external communication bus for enabling communication between multiple chassis, directly or through a switch, and with client systems. The external communication may use a technology such as Ethernet, InfiniBand, Fibre Channel, etc. In some embodiments, the external communication bus uses different communication bus technologies for inter-chassis and client communication. If a switch is deployed within or between chassis, the switch may act as a translation between multiple protocols or technologies. When multiple chassis are connected to define a storage cluster, the storage cluster may be accessed by a client using either proprietary interfaces or standard interfaces such as network file system (NFS), common internet file system (CIFS), small computer system interface (SCSI) or hypertext transfer protocol (HTTP). Translation from the client protocol may occur at the switch, chassis external communication bus or within each storage node.

Each storage node may be one or more storage servers and each storage server is connected to one or more non-volatile solid state memory units, which may be referred to as storage units. One embodiment includes a single storage server in each storage node and between one to eight non-volatile solid state memory units, however this one example is not meant to be limiting. The storage server may include a processor, dynamic random access memory (DRAM) and interfaces for the internal communication bus and power distribution for each of the power buses. Inside the storage node, the interfaces and storage unit share a communication bus, e.g., PCI Express, in some embodiments. The non-volatile solid state memory units may directly access the internal communication bus interface through a storage node communication bus, or request the storage node to access the bus interface. The non-volatile solid state memory unit contains an embedded central processing unit (CPU), solid state storage controller, and a quantity of solid state mass storage, e.g., between 2-32 terabytes (TB) in some embodiments. An embedded volatile storage medium, such as DRAM, and an energy reserve apparatus are included in the non-volatile solid state memory unit. In some embodiments, the energy reserve apparatus is a capacitor, super-capacitor, or battery that enables transferring a subset of DRAM contents to a stable storage medium in the case of power loss. In some embodiments, the non-volatile solid state memory unit is constructed with a storage class memory, such as phase change or magnetoresistive random access memory (MRAM) that substitutes for DRAM and enables a reduced power hold-up apparatus.

FIG. 1 is a perspective view of a storage cluster 160, with multiple storage nodes 150 and internal solid-state memory coupled to each storage node to provide network attached storage or storage area network, in accordance with some embodiments. A network attached storage, storage area network, or a storage cluster, or other storage memory, could include one or more storage clusters 160, each having one or more storage nodes 150, in a flexible and reconfigurable arrangement of both the physical components and the amount of storage memory provided thereby. The storage cluster 160 is designed to fit in a rack, and one or more racks can be set up and populated as desired for the storage memory. The storage cluster 160 has a chassis 138 having multiple slots 142. It should be appreciated that chassis 138 may be referred to as a housing, enclosure, or rack unit. In one embodiment, the chassis 138 has fourteen slots 142, although other numbers of slots are readily devised. For example, some embodiments have four slots, eight slots, sixteen slots, thirty-two slots, or other suitable number of slots. Each slot 142 can accommodate one storage node 150 in some embodiments. Chassis 138 includes flaps 148 that can be utilized to mount the chassis 138 on a rack. Fans 144 provide air circulation for cooling of the storage nodes 150 and components thereof, although other cooling components could be used, or an embodiment could be devised without cooling components. A switch fabric 146 couples storage nodes 150 within chassis 138 together and to a network for communication to the memory. In an embodiment depicted in FIG. 1, the slots 142 to the left of the switch fabric 146 and fans 144 are shown occupied by storage nodes 150, while the slots 142 to the right of the switch fabric 146 and fans 144 are empty and available for insertion of storage node 150 for illustrative purposes. This configuration is one example, and one or more storage nodes 150 could occupy the slots 142 in various further arrangements. The storage node arrangements need not be sequential or adjacent in some embodiments. Storage nodes 150 are hot pluggable, meaning that a storage node 150 can be inserted into a slot 142 in the chassis 138, or removed from a slot 142, without stopping or powering down the system. Upon insertion or removal of storage node 150 from slot 142, the system automatically reconfigures in order to recognize and adapt to the change. Reconfiguration, in some embodiments, includes restoring redundancy and/or rebalancing data or load.

Each storage node 150 can have multiple components. In the embodiment shown here, the storage node 150 includes a printed circuit board 158 populated by a CPU 156, i.e., processor, a memory 154 coupled to the CPU 156, and a non-volatile solid state storage 152 coupled to the CPU 156, although other mountings and/or components could be used in further embodiments. The memory 154 has instructions which are executed by the CPU 156 and/or data operated on by the CPU 156. As further explained below, the non-volatile solid state storage 152 includes flash or, in further embodiments, other types of solid-state memory.

Figure 2:
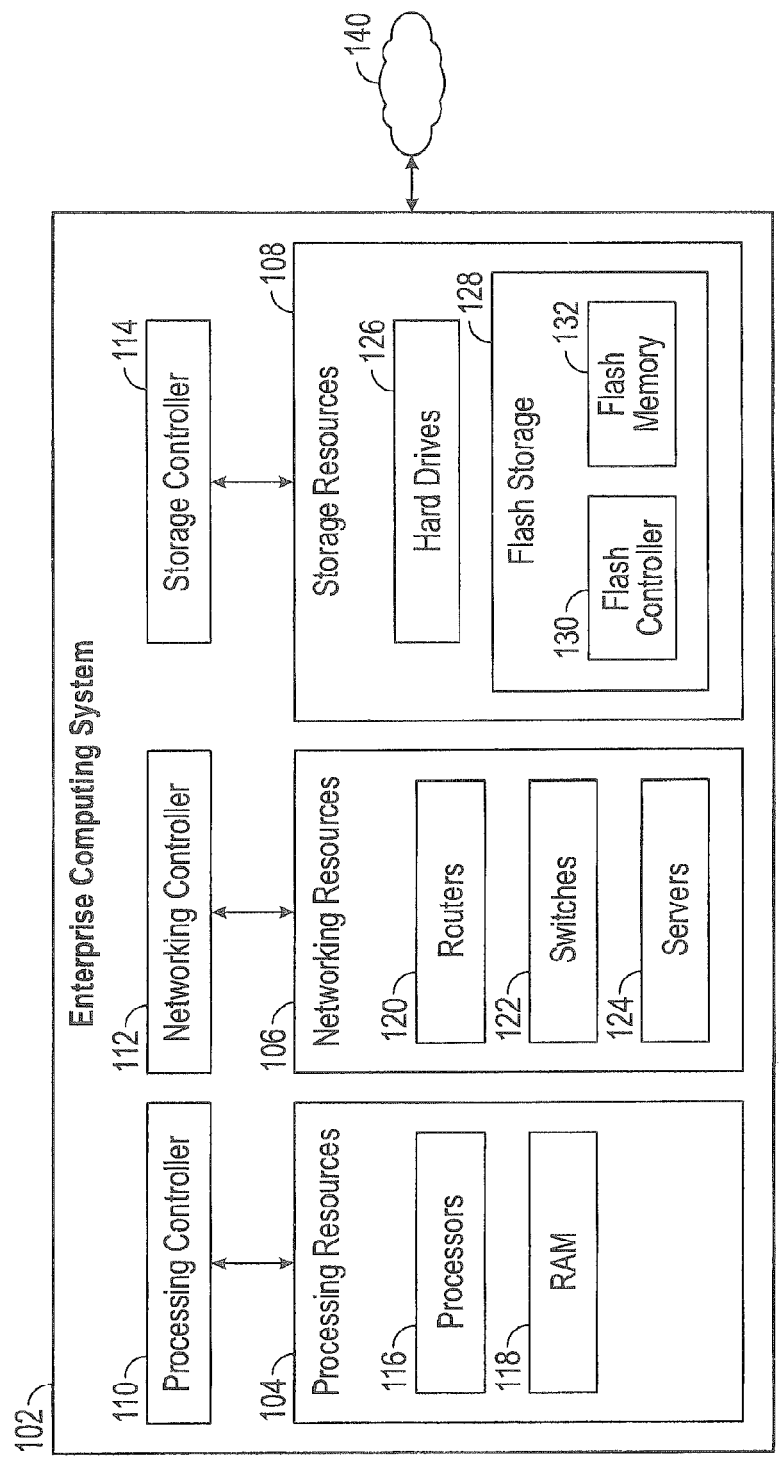
FIG. 2 is a system diagram of an enterprise computing system, which can use one or more of the storage clusters of FIG. 1 as a storage resource in some embodiments.

FIG. 2 is a system diagram of an enterprise computing system 102, which can use one or more of the storage nodes, storage clusters and/or non-volatile solid state storage of FIG. 1 as a storage resource 108. For example, flash storage 128 of FIG. 2 may integrate the storage nodes, storage clusters and/or non-volatile solid state storage of FIG. 1 in some embodiments. The enterprise computing system 102 has processing resources 104, networking resources 106 and storage resources 108, including flash storage 128. A flash controller 130 and flash memory 132 are included in the flash storage 128. In various embodiments, the flash storage 128 could include one or more storage nodes or storage clusters, with the flash controller 130 including the CPUs, and the flash memory 132 including the non-volatile solid state storage of the storage nodes. In some embodiments flash memory 132 may include different types of flash memory or the same type of flash memory. The enterprise computing system 102 illustrates an environment suitable for deployment of the flash storage 128, although the flash storage 128 could be used in other computing systems or devices, larger or smaller, or in variations of the enterprise computing system 102, with fewer or additional resources. The enterprise computing system 102 can be coupled to a network 140, such as the Internet, in order to provide or make use of services. For example, the enterprise computing system 102 could provide cloud services, physical computing resources, or virtual computing services.

In the enterprise computing system 102, various resources are arranged and managed by various controllers. A processing controller 110 manages the processing resources 104, which include processors 116 and random-access memory (RAM) 118. Networking controller 112 manages the networking resources 106, which include routers 120, switches 122, and servers 124. A storage controller 114 manages storage resources 108, which include hard drives 126 and flash storage 128. Other types of processing resources, networking resources, and storage resources could be included with the embodiments. In some embodiments, the flash storage 128 completely replaces the hard drives 126. The enterprise computing system 102 can provide or allocate the various resources as physical computing resources, or in variations, as virtual computing resources supported by physical computing resources. For example, the various resources could be implemented using one or more servers executing software. Files or data objects, or other forms of data, are stored in the storage resources 108.

In various embodiments, an enterprise computing system 102 could include multiple racks populated by storage clusters, and these could be located in a single physical location such as in a cluster or a server farm. In other embodiments the multiple racks could be located at multiple physical locations such as in various cities, states or countries, connected by a network. Each of the racks, each of the storage clusters, each of the storage nodes, and each of the non-volatile solid state storage could be individually configured with a respective amount of storage space, which is then reconfigurable independently of the others. Storage capacity can thus be flexibly added, upgraded, subtracted, recovered and/or reconfigured at each of the non-volatile solid state storages. As mentioned previously, each storage node could implement one or more servers in some embodiments.

Figure 3:
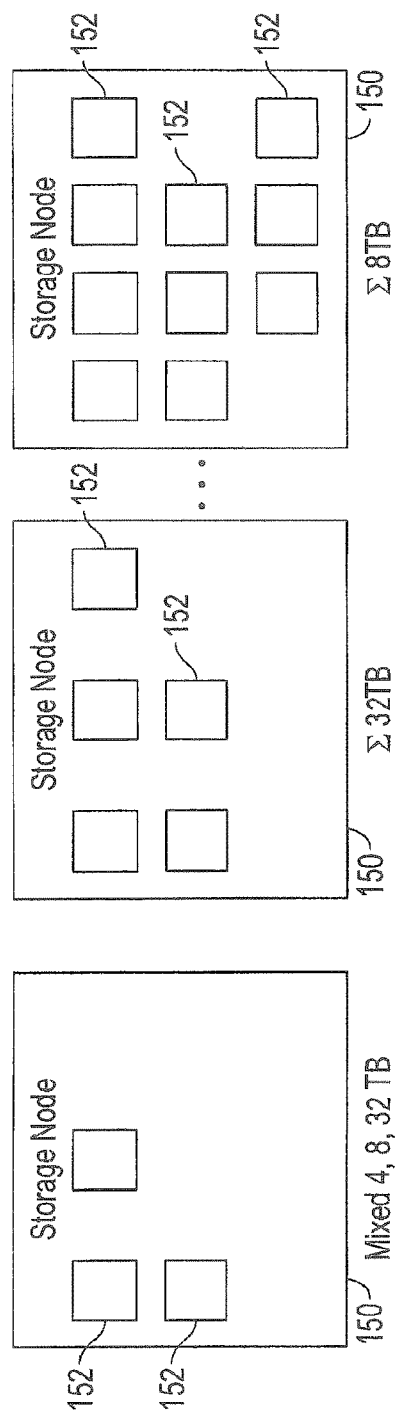
FIG. 3 is a block diagram showing multiple storage nodes and non-volatile solid state storage with differing capacities, suitable for use in the storage cluster of FIG. 1 in accordance with some embodiments.

FIG. 3 is a block diagram showing multiple storage nodes 150 and non-volatile solid state storage 152 with differing capacities, suitable for use in the chassis of FIG. 1. Each storage node 150 can have one or more units of non-volatile solid state storage 152. Each non-volatile solid state storage 152 may include differing capacity from other non-volatile solid state storage 152 on a storage node 150 or in other storage nodes 150 in some embodiments. Alternatively, all of the non-volatile solid state storages 152 on a storage node or on multiple storage nodes can have the same capacity or combinations of the same and/or differing capacities. This flexibility is illustrated in FIG. 3, which shows an example of one storage node 150 having mixed non-volatile solid state storage 152 of four, eight and thirty-two TB capacity, another storage node 150 having non-volatile solid state storage 152 each of thirty-two TB capacity, and still another storage node having non-volatile solid state storage 152 each of eight TB capacity. Various further combinations and capacities are readily devised in accordance with the teachings herein. In the context of clustering, e.g., clustering storage to form a storage cluster, a storage node can be or include a non-volatile solid state storage 152. Non-volatile solid state storage 152 is a convenient clustering point as the non-volatile solid state storage 152 may include a nonvolatile random access memory (NVRAM) component, as will be further described below.

Referring to FIGS. 1 and 3, storage cluster 160 is scalable, meaning that storage capacity with non-uniform storage sizes is readily added, as described above. One or more storage nodes 150 can be plugged into or removed from each chassis and the storage cluster self-configures in some embodiments. Plug-in storage nodes 150, whether installed in a chassis as delivered or later added, can have different sizes. For example, in one embodiment a storage node 150 can have any multiple of 4 TB, e.g., 8 TB, 12 TB, 16 TB, 32 TB, etc. In further embodiments, a storage node 150 could have any multiple of other storage amounts or capacities. Storage capacity of each storage node 150 is broadcast, and influences decisions of how to stripe the data. For maximum storage efficiency, an embodiment can self-configure as wide as possible in the stripe, subject to a predetermined requirement of continued operation with loss of up to one, or up to two, non-volatile solid state storage units 152 or storage nodes 150 within the chassis.

Figure 4:
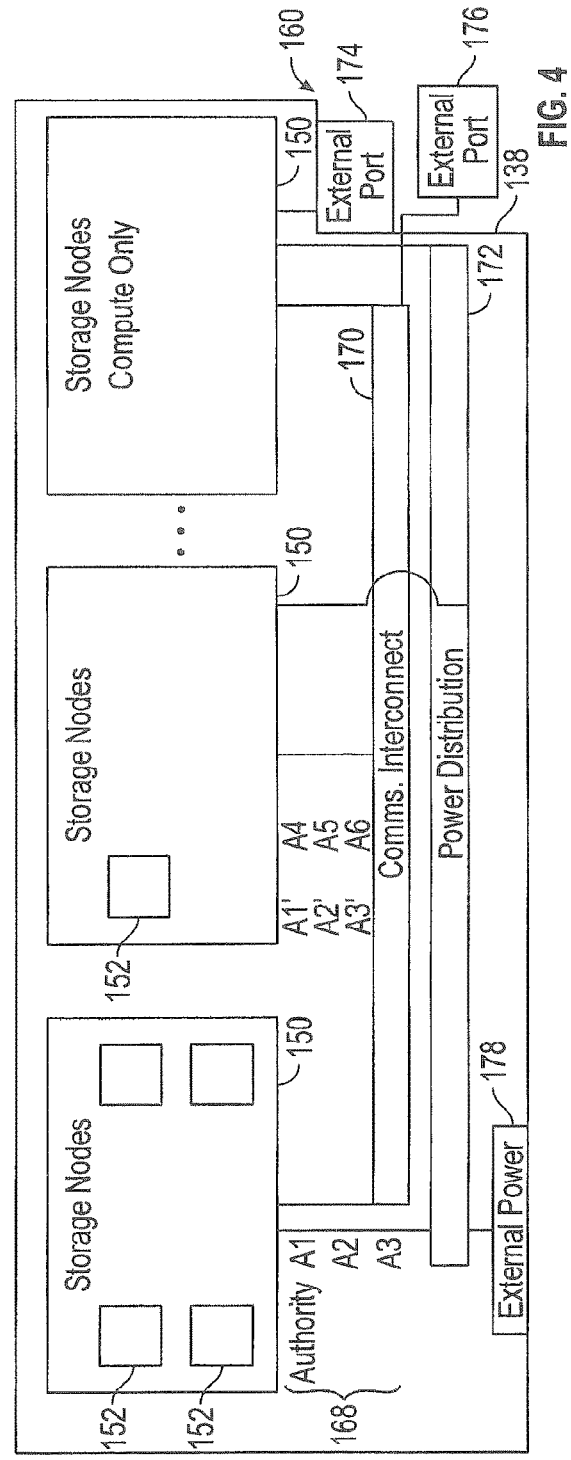
FIG. 4 is a block diagram showing an interconnect switch coupling multiple storage nodes in accordance with some embodiments.

FIG. 4 is a block diagram showing a communications interconnect 170 and power distribution bus 172 coupling multiple storage nodes 150. Referring back to FIG. 1, the communications interconnect 170 can be included in or implemented with the switch fabric 146 in some embodiments. Where multiple storage clusters 160 occupy a rack, the communications interconnect 170 can be included in or implemented with a top of rack switch, in some embodiments. As illustrated in FIG. 4, storage cluster 160 is enclosed within a single chassis 138. External port 176 is coupled to storage nodes 150 through communications interconnect 170, while external port 174 is coupled directly to a storage node. External power port 178 is coupled to power distribution bus 172. Storage nodes 150 may include varying amounts and differing capacities of non-volatile solid state storage 152 as described with reference to FIG. 3. In addition, one or more storage nodes 150 may be a compute only storage node as illustrated in FIG. 4. Authorities 168 are implemented on the non-volatile solid state storages 152, for example as lists or other data structures stored in memory. In some embodiments the authorities are stored within the non-volatile solid state storage 152 and supported by software executing on a controller or other processor of the non-volatile solid state storage 152. In a further embodiment, authorities 168 are implemented on the storage nodes 150, for example as lists or other data structures stored in the memory 154 and supported by software executing on the CPU 156 of the storage node 150. Authorities 168 control how and where data is stored in the non-volatile solid state storages 152 in some embodiments. This control assists in determining which type of erasure coding scheme is applied to the data, and which storage nodes 150 have which portions of the data. Each authority 168 may be assigned to a non-volatile solid state storage 152. Each authority may control a range of mode numbers, segment numbers, or other data identifiers which are assigned to data by a file system, by the storage nodes 150, or by the non-volatile solid state storage 152, in various embodiments.

Every piece of data, and every piece of metadata, has redundancy in the system in some embodiments. In addition, every piece of data and every piece of metadata has an owner, which may be referred to as an authority. If that authority is unreachable, for example through failure of a storage node, there is a plan of succession for how to find that data or that metadata. In various embodiments, there are redundant copies of authorities 168. Authorities 168 have a relationship to storage nodes 150 and non-volatile solid state storage 152 in some embodiments. Each authority 168, covering a range of data segment numbers or other identifiers of the data, may be assigned to a specific non-volatile solid state storage 152. In some embodiments the authorities 168 for all of such ranges are distributed over the non-volatile solid state storages 152 of a storage cluster. Each storage node 150 has a network port that provides access to the non-volatile solid state storage(s) 152 of that storage node 150. Data can be stored in a segment, which is associated with a segment number and that segment number is an indirection for a configuration of a RAID (redundant array of independent disks) stripe in some embodiments. The assignment and use of the authorities 168 thus establishes an indirection to data. Indirection may be referred to as the ability to reference data indirectly, in this case via an authority 168, in accordance with some embodiments. A segment identifies a set of non-volatile solid state storage 152 and a local identifier into the set of non-volatile solid state storage 152 that may contain data. In some embodiments, the local identifier is an offset into the device and may be reused sequentially by multiple segments. In other embodiments the local identifier is unique for a specific segment and never reused. The offsets in the non-volatile solid state storage 152 are applied to locating data for writing to or reading from the non-volatile solid state storage 152 (in the form of a RAID stripe). Data is striped across multiple units of non-volatile solid state storage 152, which may include or be different from the non-volatile solid state storage 152 having the authority 168 for a particular data segment.

If there is a change in where a particular segment of data is located, e.g., during a data move or a data reconstruction, the authority 168 for that data segment should be consulted, at that non-volatile solid state storage 152 or storage node 150 having that authority 168. In order to locate a particular piece of data, embodiments calculate a hash value for a data segment or apply an inode number or a data segment number. The output of this operation points to a non-volatile solid state storage 152 having the authority 168 for that particular piece of data. In some embodiments there are two stages to this operation. The first stage maps an entity identifier (ID), e.g., a segment number, inode number, or directory number to an authority identifier. This mapping may include a calculation such as a hash or a bit mask. The second stage is mapping the authority identifier to a particular non-volatile solid state storage 152, which may be done through an explicit mapping. The operation is repeatable, so that when the calculation is performed, the result of the calculation repeatably and reliably points to a particular non-volatile solid state storage 152 having that authority 168. The operation may include the set of reachable storage nodes as input. If the set of reachable non-volatile solid state storage units changes the optimal set changes. In some embodiments, the persisted value is the current assignment (which is always true) and the calculated value is the target assignment the cluster will attempt to reconfigure towards. This calculation may be used to determine the optimal non-volatile solid state storage 152 for an authority in the presence of a set of non-volatile solid state storage 152 that are reachable and constitute the same cluster. The calculation also determines an ordered set of peer non-volatile solid state storage 152 that will also record the authority to non-volatile solid state storage mapping so that the authority may be determined even if the assigned non-volatile solid state storage is unreachable. A duplicate or substitute authority 168 may be consulted if a specific authority 168 is unavailable in some embodiments.

With reference to FIGS. 1-4, two of the many tasks of the CPU 156 on a storage node 150 are to break up write data, and reassemble read data. When the system has determined that data is to be written, the authority 168 for that data is located as above. When the segment ID for data is already determined the request to write is forwarded to the non-volatile solid state storage 152 currently determined to be the host of the authority 168 determined from the segment. The host CPU 156 of the storage node 150, on which the non-volatile solid state storage 152 and corresponding authority 168 reside, then breaks up or shards the data and transmits the data out to various non-volatile solid state storage 152. The transmitted data is written as a data stripe in accordance with an erasure coding scheme. In some embodiments, data is requested to be pulled, and in other embodiments, data is pushed. In reverse, when data is read, the authority 168 for the segment ID containing the data is located as described above. The host CPU 156 of the storage node 150 on which the non-volatile solid state storage 152 and corresponding authority 168 reside requests the data from the non-volatile solid state storage and corresponding storage nodes pointed to by the authority. In some embodiments the data is read from flash storage as a data stripe. The host CPU 156 of storage node 150 then reassembles the read data, correcting any errors (if present) according to the appropriate erasure coding scheme, and forwards the reassembled data to the network. In further embodiments, some or all of these tasks can be handled in the non-volatile solid state storage 152. In some embodiments, the segment host requests the data be sent to storage node 150 by requesting pages from storage and then sending the data to the storage node making the original request.

In some systems, for example in UNIX-style file systems, data is handled with an index node or inode, which specifies a data structure that represents an object in a file system. The object could be a file or a directory, for example. Metadata may accompany the object, as attributes such as permission data and a creation timestamp, among other attributes. A segment number could be assigned to all or a portion of such an object in a file system. In other systems, data segments are handled with a segment number assigned elsewhere. For purposes of discussion, the unit of distribution is an entity, and an entity can be a file, a directory or a segment. That is, entities are units of data or metadata stored by a storage system. Entities are grouped into sets called authorities.

Each authority has an authority owner, which is a storage node that has the exclusive right to update the entities in the authority. In other words, a storage node contains the authority, and that the authority, in turn, contains entities.

A segment is a logical container of data in accordance with some embodiments. A segment is an address space between medium address space and physical flash locations, i.e., the data segment number, are in this address space. Segments may also contain metadata, which enable data redundancy to be restored (rewritten to different flash locations or devices) without the involvement of higher level software. In one embodiment, an internal format of a segment contains client data and medium mappings to determine the position of that data. Each data segment is protected, e.g., from memory and other failures, by breaking the segment into a number of data and parity shards, where applicable. The data and parity shards are distributed, i.e., striped, across non-volatile solid state storage 152 coupled to the host CPUs 156 (See FIG. 5) in accordance with an erasure coding scheme. Usage of the term segments refers to the container and its place in the address space of segments in some embodiments. Usage of the term stripe refers to the same set of shards as a segment and includes how the shards are distributed along with redundancy or parity information in accordance with some embodiments.

A series of address-space transformations takes place across an entire storage system. At the top is the directory entries (file names) which link to an inode. Modes point into medium address space, where data is logically stored. Medium addresses may be mapped through a series of indirect mediums to spread the load of large files, or implement data services like deduplication or snapshots. Medium addresses may be mapped through a series of indirect mediums to spread the load of large files, or implement data services like deduplication or snapshots. Segment addresses are then translated into physical flash locations. Physical flash locations have an address range bounded by the amount of flash in the system in accordance with some embodiments. Medium addresses and segment addresses are logical containers, and in some embodiments use a 128 bit or larger identifier so as to be practically infinite, with a likelihood of reuse calculated as longer than the expected life of the system. Addresses from logical containers are allocated in a hierarchical fashion in some embodiments. Initially, each non-volatile solid state storage 152 may be assigned a range of address space. Within this assigned range, the non-volatile solid state storage 152 is able to allocate addresses without synchronization with other non-volatile solid state storage 152.

Data and metadata is stored by a set of underlying storage layouts that are optimized for varying workload patterns and storage devices. These layouts incorporate multiple redundancy schemes, compression formats and index algorithms. Some of these layouts store information about authorities and authority masters, while others store file metadata and file data. The redundancy schemes include error correction codes that tolerate corrupted bits within a single storage device (such as a NAND flash chip), erasure codes that tolerate the failure of multiple storage nodes, and replication schemes that tolerate data center or regional failures. In some embodiments, low density parity check (LDPC) code is used within a single storage unit. Reed-Solomon encoding is used within a storage cluster, and mirroring is used within a storage grid in some embodiments. Metadata may be stored using an ordered log structured index (such as a Log Structured Merge Tree), and large data may not be stored in a log structured layout.

In order to maintain consistency across multiple copies of an entity, the storage nodes agree implicitly on two things through calculations: (1) the authority that contains the entity, and (2) the storage node that contains the authority. The assignment of entities to authorities can be done by pseudorandomly assigning entities to authorities, by splitting entities into ranges based upon an externally produced key, or by placing a single entity into each authority. Examples of pseudorandom schemes are linear hashing and the Replication Under Scalable Hashing (RUSH) family of hashes, including Controlled Replication Under Scalable Hashing (CRUSH). In some embodiments, pseudo-random assignment is utilized only for assigning authorities to nodes because the set of nodes can change. The set of authorities cannot change so any subjective function may be applied in these embodiments. Some placement schemes automatically place authorities on storage nodes, while other placement schemes rely on an explicit mapping of authorities to storage nodes. In some embodiments, a pseudorandom scheme is utilized to map from each authority to a set of candidate authority owners. A pseudorandom data distribution function related to CRUSH may assign authorities to storage nodes and create a list of where the authorities are assigned. Each storage node has a copy of the pseudorandom data distribution function, and can arrive at the same calculation for distributing, and later finding or locating an authority. Each of the pseudorandom schemes requires the reachable set of storage nodes as input in some embodiments in order to conclude the same target nodes. Once an entity has been placed in an authority, the entity may be stored on physical devices so that no expected failure will lead to unexpected data loss. In some embodiments, rebalancing algorithms attempt to store the copies of all entities within an authority in the same layout and on the same set of machines.

Examples of expected failures include device failures, stolen machines, datacenter fires, and regional disasters, such as nuclear or geological events. Different failures lead to different levels of acceptable data loss. In some embodiments, a stolen storage node impacts neither the security nor the reliability of the system, while depending on system configuration, a regional event could lead to no loss of data, a few seconds or minutes of lost updates, or even complete data loss.

In the embodiments, the placement of data for storage redundancy is independent of the placement of authorities for data consistency. In some embodiments, storage nodes that contain authorities do not contain any persistent storage. Instead, the storage nodes are connected to non-volatile solid state storage units that do not contain authorities. The communications interconnect between storage nodes and non-volatile solid state storage units consists of multiple communication technologies and has non-uniform performance and fault tolerance characteristics. In some embodiments, as mentioned above, non-volatile solid state storage units are connected to storage nodes via PCI express, storage nodes are connected together within a single chassis using an Ethernet backplane, and chassis are connected together to form a storage cluster. Storage clusters are connected to clients using Ethernet or fiber channel in some embodiments. If multiple storage clusters are configured into a storage grid, the multiple storage clusters are connected using the Internet or other long-distance networking links, such as a "metro scale" link or private link that does not traverse the internet.

Authority owners have the exclusive right to modify entities, to migrate entities from one non-volatile solid state storage unit to another non-volatile solid state storage unit, and to add and remove copies of entities. This allows for maintaining the redundancy of the underlying data. When an authority owner fails, is going to be decommissioned, or is overloaded, the authority is transferred to a new storage node. Transient failures make it non-trivial to ensure that all non-faulty machines agree upon the new authority location. The ambiguity that arises due to transient failures can be achieved automatically by a consensus protocol such as Paxos, hot-warm failover schemes, via manual intervention by a remote system administrator, or by a local hardware administrator (such as by physically removing the failed machine from the cluster, or pressing a button on the failed matching). In some embodiments, a consensus protocol is used, and failover is automatic. If too many failures or replication events occur in too short a time period, the system goes into a self-preservation mode and halts replication and data movement activities until an administrator intervenes in accordance with some embodiments.

As authorities are transferred between storage nodes and authority owners update entities in their authorities, the system transfers messages between the storage nodes and non-volatile solid state storage units. With regard to persistent messages, messages that have different purposes are of different types. Depending on the type of the message, the system maintains different ordering and durability guarantees. As the persistent messages are being processed, the messages are temporarily stored in multiple durable and non-durable storage hardware technologies. In some embodiments, messages are stored in RAM, NVRAM and on NAND flash devices, and a variety of protocols are used in order to make efficient use of each storage medium. Latency-sensitive client requests may be persisted in replicated NVRAM, and then later NAND, while background rebalancing operations are persisted directly to NAND.

Persistent messages are persistently stored prior to being replicated. This allows the system to continue to serve client requests despite failures and component replacement. Although many hardware components contain unique identifiers that are visible to system administrators, manufacturer, hardware supply chain and ongoing monitoring quality control infrastructure, applications running on top of the infrastructure address virtualize addresses. These virtualized addresses do not change over the lifetime of the storage system, regardless of component failures and replacements. This allows each component of the storage system to be replaced over time without reconfiguration or disruptions of client request processing.

In some embodiments, the virtualized addresses are stored with sufficient redundancy. A continuous monitoring system correlates hardware and software status and the hardware identifiers. This allows detection and prediction of failures due to faulty components and manufacturing details. The monitoring system also enables the proactive transfer of authorities and entities away from impacted devices before failure occurs by removing the component from the critical path in some embodiments.

Figure 5:
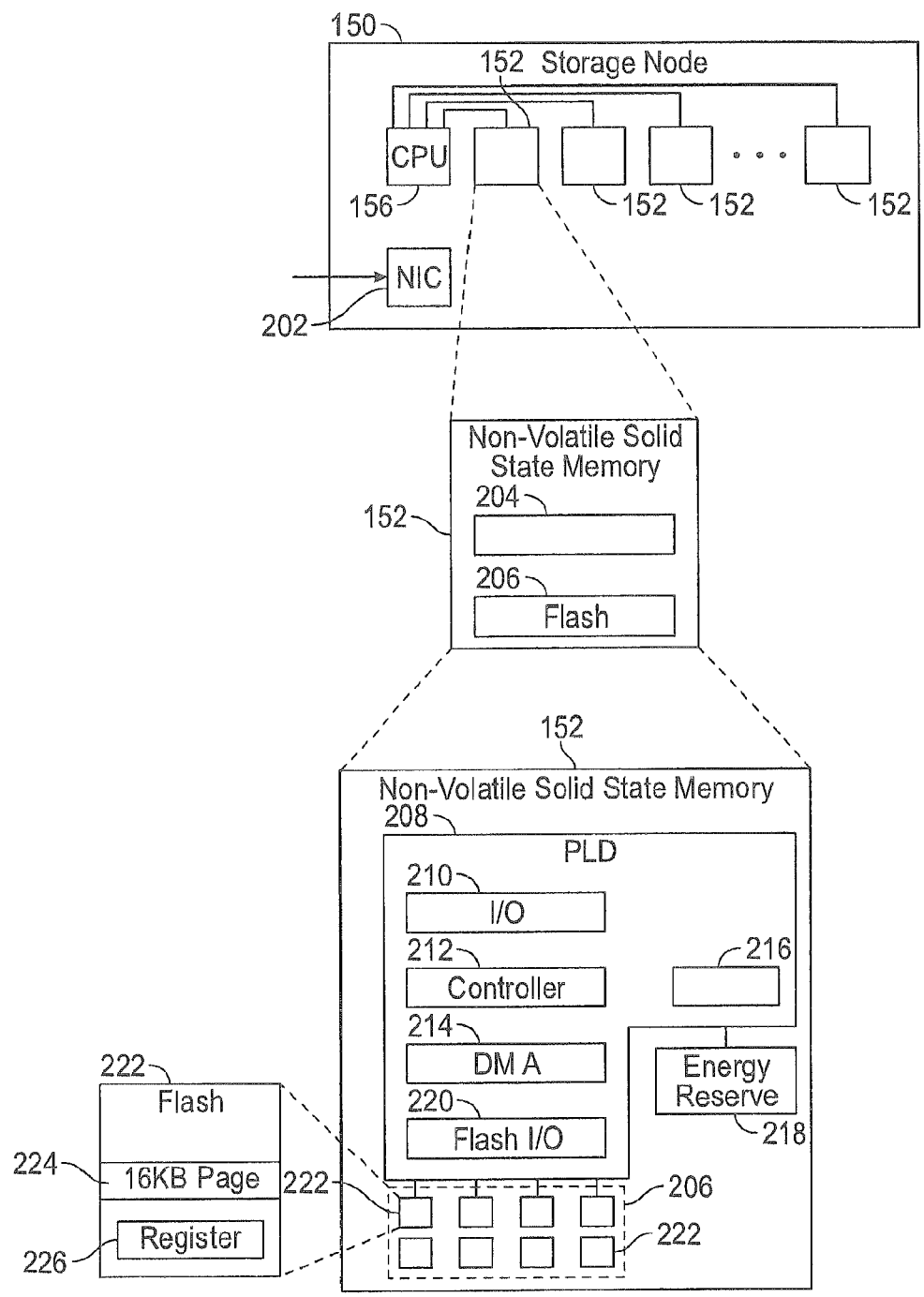
FIG. 5 is a multiple level block diagram, showing contents of a storage node and contents of one of the non-volatile solid state storage units in accordance with some embodiments.

FIG. 5 is a multiple level block diagram, showing contents of a storage node 150 and contents of a non-volatile solid state storage 152 of the storage node 150. Data is communicated to and from the storage node 150 by a network interface controller (NIC) 202 in some embodiments. Each storage node 150 has a CPU 156, and one or more non-volatile solid state storage 152, as discussed above. Moving down one level in FIG. 5, each non-volatile solid state storage 152 has a relatively fast non-volatile solid state memory, such as nonvolatile random access memory (NVRAM) 204, and flash memory 206. In some embodiments, NVRAM 204 may be a component that does not require program/erase cycles (DRAM, MRAM, PCM), and can be a memory that can support being written vastly more often than the memory is read from. Moving down another level in FIG. 5, the NVRAM 204 is implemented in one embodiment as high speed volatile memory, such as dynamic random access memory (DRAM) 216, backed up by energy reserve 218. Energy reserve 218 provides sufficient electrical power to keep the DRAM 216 powered long enough for contents to be transferred to the flash memory 206 in the event of power failure. In some embodiments, energy reserve 218 is a capacitor, super-capacitor, battery, or other device, that supplies a suitable supply of energy sufficient to enable the transfer of the contents of DRAM 216 to a stable storage medium in the case of power loss. The flash memory 206 is implemented as multiple flash dies 222, which may be referred to as packages of flash dies 222 or an array of flash dies 222. It should be appreciated that the flash dies 222 could be packaged in any number of ways, with a single die per package, multiple dies per package (i.e. multichip packages), in hybrid packages, as bare dies on a printed circuit board or other substrate, as encapsulated dies, etc. In the embodiment shown, the non-volatile solid state storage 152 has a controller 212 or other processor, and an input output (I/O) port 210 coupled to the controller 212. I/O port 210 is coupled to the CPU 156 and/or the network interface controller 202 of the flash storage node 150. Flash input output (I/O) port 220 is coupled to the flash dies 222, and a direct memory access unit (DMA) 214 is coupled to the controller 212, the DRAM 216 and the flash dies 222. In the embodiment shown, the I/O port 210, controller 212, DMA unit 214 and flash I/O port 220 are implemented on a programmable logic device (PLD) 208, e.g., a field programmable gate array (FPGA). In this embodiment, each flash die 222 has pages, organized as sixteen kB (kilobyte) pages 224, and a register 226 through which data can be written to or read from the flash die 222. In further embodiments, other types of solid-state memory are used in place of, or in addition to flash memory illustrated within flash die 222.

Figure 6A:
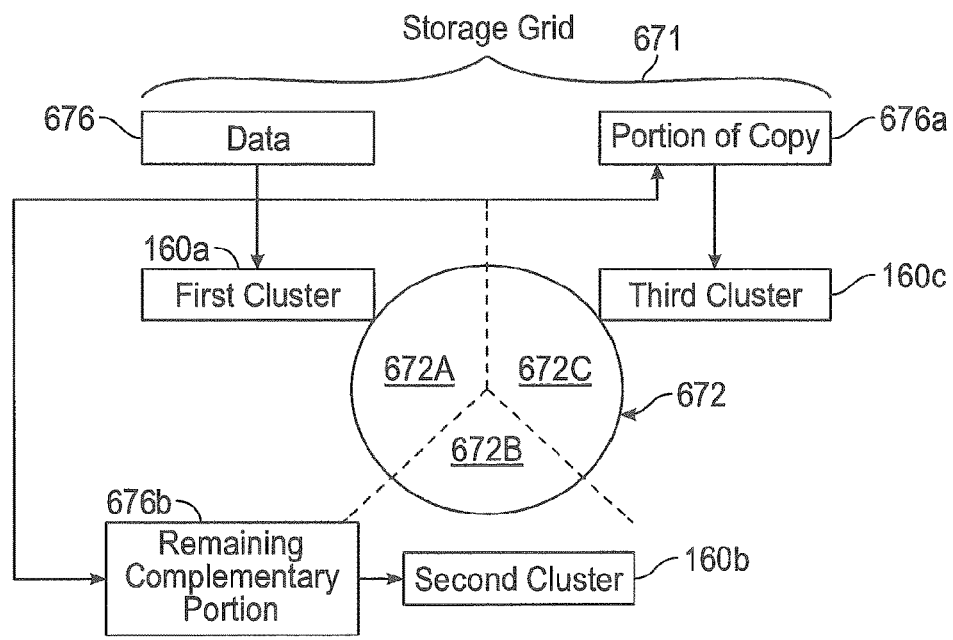
FIGS. 6A-C are block diagrams illustrating a storage grid, which could include storage units having solid-state memory, or other types of storage, splitting a copy of data in various proportions, in accordance with some embodiments.
Figure 6B:
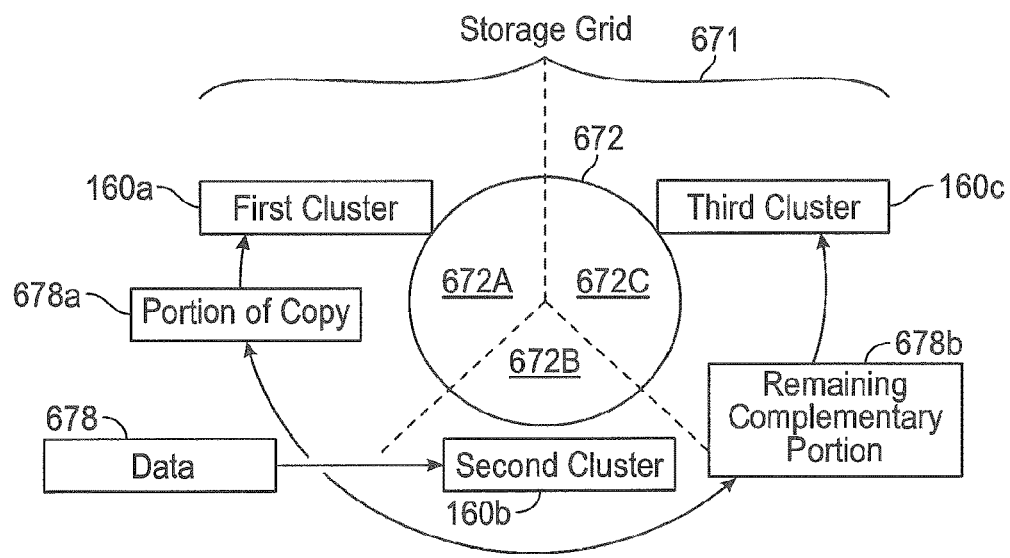
Figure 6C:
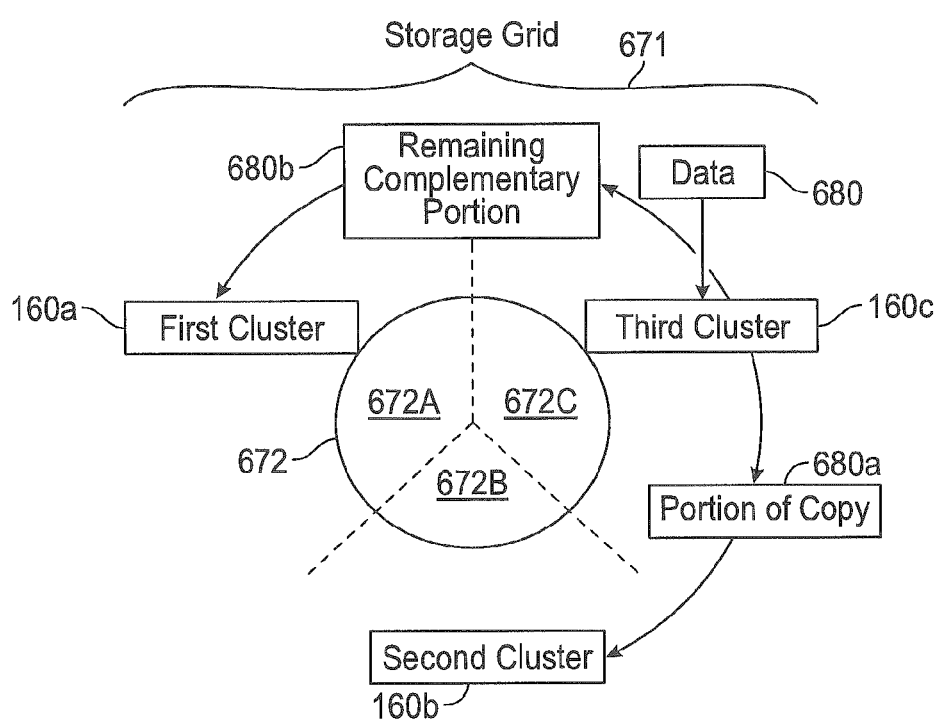

FIGS. 6A-C are block diagrams illustrating a storage grid 671 splitting a copy of data in various proportions, in accordance with some embodiments. Storage clusters 160A, 160B, and 160C are depicted in three related scenarios as members of the storage grid 671. Embodiments depicted in FIGS. 6A-C, and variations thereof, demonstrate survivability of data and storage under failure or theft of one of the storage clusters 160A, 160B, 160C. The three storage clusters 160A, 160B, 160C, are positioned around a region 672 or other defined area. The region 672 could be a city, a data center, a campus with differing failure domains 672A, 672B, and 672C or some other defined area in some embodiments. Each of the storage clusters within the storage grid is separated from each other storage cluster by a portion of a width of the region 672 or other defined area, and/or by differences in the failure domains, e.g., each of the storage clusters has separate power systems. The geographical separation of storage clusters 160A, 160B, and 160C provides a measure of protection against physical disasters such as an explosion, a building collapse, local flooding, a fire, and so on. Such separations are by example only, and other separations are possible. The maximum separation between storage clusters 160A, 160B, and 160C may be related to a specified time delay in a network, so that delays are not excessive.

When data arrives at storage cluster 160A, the data is stored, and copies of portions of the data are stored at additional storage clusters. For example, a fractional portion of the data stored in storage cluster 160A is sent to storage cluster 160B and the remaining complementary fractional portion of the data is sent to storage cluster 160C. A similar sequence is followed when data arrives at either of the other two storage clusters 160B or 160C as illustrated in FIGS. 6B and 6C, respectively. In some embodiments, the storage grid may determine to distribute the portions of the data stored at storage clusters 160B and 160C non-equally based on external factors such as performance, available storage space, or some other reason. Over time with many data writes, data becomes distributed among the three storage clusters 160A, 160B, and 160C in such a manner that no one storage cluster 160A, 160B, 160C has all of the data. However, the data can be read from, recovered or reconstructed from any two of the storage clusters 160A, 160B, 160C. In some embodiments the recovery of the data is performed by interleaving the recovered data portions from alternating storage clusters.

In the scenario of FIG. 6A, data 676 arrives at the storage cluster 160A, which stores a copy of the data. Storage cluster 160A then forwards a portion 676A of a copy of the data 676 to the storage cluster 160C for storage. Storage cluster 160A also forwards the remaining complementary portion 676B of the data 676 to storage cluster 160B for storage. In the scenario of FIGS. 6B and 6C a similar methodology is followed where a first storage cluster retains a copy of the received data and then forwards a portion of the data and the complementary remaining portion of the data to a second and third storage cluster. Thus, after the operations depicted in the FIGS. 6A-C occur, the first storage cluster 160A has a full copy of the first data 676, a copy of a portion 678A of the second data 678, and a copy of a portion 680B of the third data 680. The second storage cluster 160B has a full copy of the second data 678, a copy of a portion 676B of the first data 676, and a copy of a portion 680B of the third data 680. The third storage cluster 160C has a full copy of the third data 680, a copy of a portion 676A of the first data, and a copy of a portion 678B of the second data 678. In order to read the first data 676, a read from the first storage cluster 160A, or a read of data portions 676B and 676A from the second storage cluster 160B and the third storage cluster 160C, respectively, would suffice. A read of the second data 678 and the third data 680 can be accomplished in a similar manner through the appropriate storage cluster that has the full copy of the corresponding data or a combination of the storage clusters that have the portion and the complementary portion of the corresponding data. When data is split and one portion of the data is sent to each of two storage clusters, the two portions of the data are differing, complementary portions of the data, such that the data can be reconstructed by combining the two portions of the data together.

The data may be split according to a granularity of a segment, a block, a file, a byte, a word, a bit, or other granularity. In some embodiments, data is split to granularity of one segment, by sending alternating segments to each of two storage clusters. For example, the entirety of the data may be stored at storage cluster 160A. Then a copy of the data is segmented and a first segment is sent to storage cluster 160B, a second segment is sent to storage cluster 160C, a third segment is sent to storage cluster 160B, a fourth segment is sent to the storage cluster 160C, and so on in an alternating fashion until all the segments of the entirety of the data have been distributed. At the end of the operation, one of the storage clusters 160A has all of the data segments, and each of the other two storage clusters 160B and 160C has a portion of the data segments. The arrangement for splitting the data could be fixed throughout the operations, change with each sending according to some algorithm, or change periodically according to some other schedule. The splitting of data could be managed by a portion of a network coupling the storage clusters 160A, 160B, 160C, or by the storage clusters 160A, 160B, 160C themselves. A network could route data to the nearest storage cluster 160A, 160B, 160C. The nearest storage cluster may be determined by estimated network delay on paths to the storage clusters 160A, 160B, and 160C in some embodiments. Data could be routed in one or both directions around a ring network, or propagated along a star network, or routed along any suitable network architecture. Embodiments with more than three storage clusters within a storage grid could also be devised, with various splits of data among the storage clusters. The three storage clusters 160A-C do not need to be of equal storage size or storage type.

In some embodiments, the first cluster 160A may be full. In that instance, a full copy of the data 676 may be sent to the second cluster 160B and another full copy of the data 676 may be sent to the third cluster 160C to ensure that at least one full copy can be constructed by any two members of the storage grid 671 (i.e., two of the clusters 160A, 160B, 160C) regardless of which cluster 160A, 160B, 160C fails. In other embodiments a policy may dictate that a full copy of the data 676 is stored on the first cluster 160A, a full copy is stored on the second cluster 160B, and a full copy is stored on the third cluster 160C for reasons other than efficiency. For example, the policy may be directed toward accelerating performance for local access.

Still referring to FIGS. 6A-C, two full copies of each data 676, 678, 680 are distributed so that two storage clusters can always recreate or recover the data. The two storage clusters can recreate the data either by any one of the storage having a full copy of the data or by two of the storage clusters having portions of the data arranged so that when combined a complete copy of the data is reconstituted. Further embodiments can be created by generalizing to systems holding data (m) and redundant data (n), with m+n*2 locations. For example, with m=1, n=1, the total number of systems is three.

It should be appreciated that the above scenarios apply when the storage grid 671 is operating at full redundancy, or when there is a disaster or other disconnection. There may be periods of time in which one of the storage clusters 160A, 160B, or 160C is temporarily unreachable and some data is present only on a single system. The system could temporarily store full copies of data on the remaining reachable clusters, and not send data to the unreachable cluster. The system could later redistribute data per the above descriptions to restore the steady state once the unreachable cluster comes back on line or is replaced.

Figure 7:
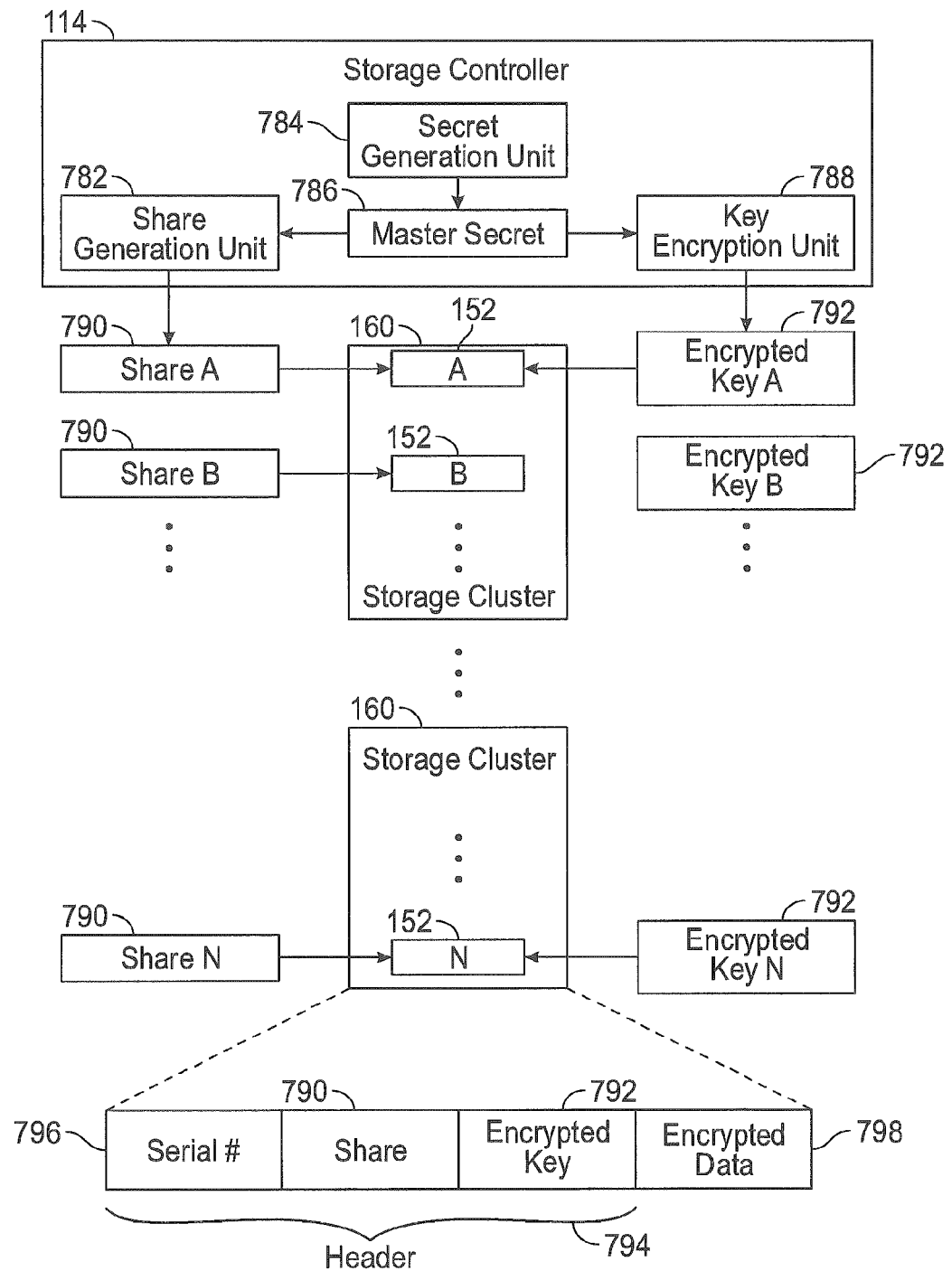
FIG. 7 is a block diagram of a mechanism for shared secrets, which can be utilized by the storage clusters of FIGS. 6A-C in accordance with some embodiments.

FIG. 7 is a block diagram of a mechanism for shared secrets, which can be utilized by the storage clusters of FIGS. 6A-C in accordance with some embodiments. In this embodiment, a shared secret is generated and applied to encrypt keys used in encrypting and decrypting data stored in non-volatile solid state storage 152. The mechanism for shared secrets can be applied to non-volatile solid state storage 152 in a storage cluster, such as the storage clusters described with reference to FIGS. 6A-C. Non-volatile solid state storage 152 are arranged in storage clusters 160, and store encrypted data 798 along with a header 794, in the embodiment shown in FIG. 7. The header specifies a serial number 796, which is unique for each non-volatile solid state storage 152, a share 790, and an encrypted key 792. The decrypted key (i.e., the key used for encrypting data, prior to encrypting the key) can be generated by various mechanisms, for example by a key generation algorithm, executing in the storage unit 152, in a storage node 150, or in the storage controller 114, or by firmware or hardware therein.

Still referring to FIG. 7, the storage controller 114 has a secret generation unit 784, which generates a shared secret according to a secret sharing scheme such as the Shamir, Blakley, or Krawczyk secret sharing schemes, or the Chinese Remainder Theorem. These examples of secret sharing schemes are not meant to be limiting or to preclude the use of other secret sharing schemes. In some embodiments the shared secret could include one or more values of constant terms in a polynomial, with the number of shares needed to reconstruct the secret determined by the order of the polynomial. In other embodiments, Lagrange basis polynomials are computed from shares in order to reconstruct the master secret. In other embodiments, the number of shares or storage clusters that are sufficient to recover the master secret, which is derived from the shared secret, is one (or another predetermined number) less than the number of storage clusters that are distributed. With reference to the example arrangement of storage clusters shown in FIG. 6A-C, three shares may distributed (e.g., one to each of three storage clusters 160A, 160B, 160C). If one storage cluster becomes unavailable through failure or theft of a storage cluster, the two storage clusters remaining are sufficient to recover the master secret, from which keys can be decrypted and data decrypted at the remaining storage clusters. In some embodiments, for a given storage cluster, decrypting the encrypted key applies a device-specific value, such as the serial number 796 of the non-volatile solid state storage 152.

Continuing with FIG. 7, the master secret module 786 coordinates with the share generation unit 782, which generates shares 790 of the shared secret. Further, the master secret module 786 coordinates with the key encryption unit 788, to produce encrypted keys 792 from the decrypted key for each storage unit 152, by application of the shared secret. Each time data is written to a storage unit 152, the header 794 includes the appropriate share 790 and encrypted key 792, as distributed by the shared generation unit 782 and the key encryption unit 788, respectively. In this manner data could be encrypted at each of the storage clusters in FIGS. 6A-C. Theft of any one of the storage clusters would not reveal the master secret or allow decryption of the keys. Failure at any one of the storage clusters could still be followed by recovery of the master secret from the remaining storage clusters. In this context, all storage clusters are able to participate in the processing of stored data, and, if a failure occurs, two of the storage clusters have sufficient content to re-create 100% of the data as well as 100% of the decryption key.

In some cases there may be an additional key added externally to one or more of the storage clusters. This additional key is used to enable external data access through that storage cluster. The additional key may be in the form of a password, physical token or other mechanism. This allows the local storage cluster to be placed in a distrusted environment without concerns about unauthorized access through that cluster. In some cases the additional physical and/or logical key may be present in a trusted environment. The key may be removed by a user to disable external access to data through that storage cluster without shutting down functionality of the storage grid. A user may at a later time add back a key or token to the system to re-authorize data access through that storage cluster.

In one embodiment, storage clusters allow external connectivity to themselves using identical addresses (e.g., identical IP addresses), in order to provide the capability of offering locally accessible storage using one global network address. In this embodiment, clients choose which physical path to take to communicate to the closest storage cluster by sending traffic to the network and the network routers send data packets to the closest storage cluster using routing techniques such as OSPF (Open Shortest Path First) routes or BGP (Border Gateway Protocol) health injection routes. In further examples, the network interfaces for each of the storage clusters of the storage grid may be completely different from each other, and hosts could connect to each of the storage clusters by unique addresses bound to each storage cluster.

Figure 8:
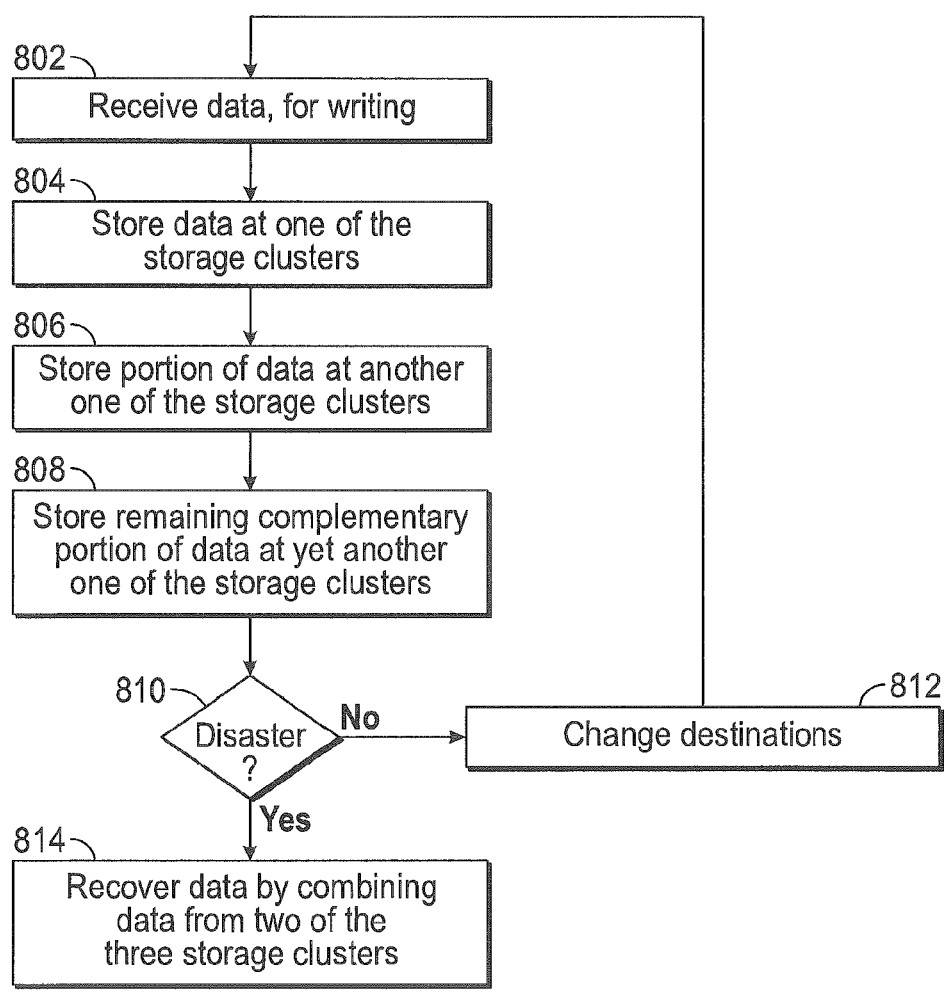
FIG. 8 is a flow diagram of a method of storing data in a storage grid, which can be practiced on or by embodiments of the storage clusters in accordance with some embodiments.

FIG. 8 is a flow diagram of a method of storing data in a storage grid. The method may be practiced with other types of storage beside solid state storage. Many of the actions described in the method can be performed by one or more processors. In an action 802, data is received for writing. For example, a storage cluster that is one of the three storage clusters in the arrangement depicted in FIG. 6A-C could receive data from the network for writing to the storage cluster. In an action 804, the data is stored at one of the storage clusters. This could be the storage cluster that received the data, or the data could be passed to another one of the storage clusters and written to that storage cluster.

In an action 806 of FIG. 8, a fraction or portion of the data is stored at a second storage cluster. For example, a different storage cluster from the storage cluster that stored the full copy of the data in action 804 stores a portion of the data. In an action 808, the remaining complementary portion of the data is stored at a third storage cluster. The remaining complementary portion of the data could be formed by taking the difference between a full copy of the data and the portion of the data that is stored in the action 806. In some embodiments this could be accomplished by sending alternating segments or other portions of data to each of two storage clusters, while one storage cluster, differing from these two storage clusters, retains a full copy of the data as a result of performing the action 804.

In a decision action 810, it is determined if there is a disaster. For example, there could be a power failure, component failure, system failure, or theft, at one of the storage clusters. If there is a disaster, flow proceeds to the action 814, in order to initiate recovery. If there is no disaster, flow proceeds to the action 812 in order to change data destinations in the storage grid. For example, the next incoming data could be routed to one of the storage clusters that is different than the storage cluster to which the full copy of the previous data was written. Rotating the sequences of receiving and storing data may be accomplished through a random selection, or data could be routed to the nearest one of the storage clusters each time new data is received for writing, among other techniques. Over time, for whichever mechanism is employed, the destinations of the full copy and copy portions are changed so that no single storage cluster has a copy of all of the data that has been received over time at the storage grid. In addition, any two of the storage clusters in combination have at least a copy of all of the data that has been received over time at the storage grid.

If there is a disaster then data is recovered by combining data from two of the three storage clusters in action 814. In some embodiments the recovery is achieved by interleaving the recovered data potions from alternating storage clusters. Such recovery is possible as a result of the storing, in actions 804, 806, 808, and the systematic changing of destinations in action 812. In some embodiments, the action of recovering data includes recovering a shared secret as described above with reference to FIG. 7, and decrypting data via application of the recovered shared secret to decrypt keys.

Figure 9:
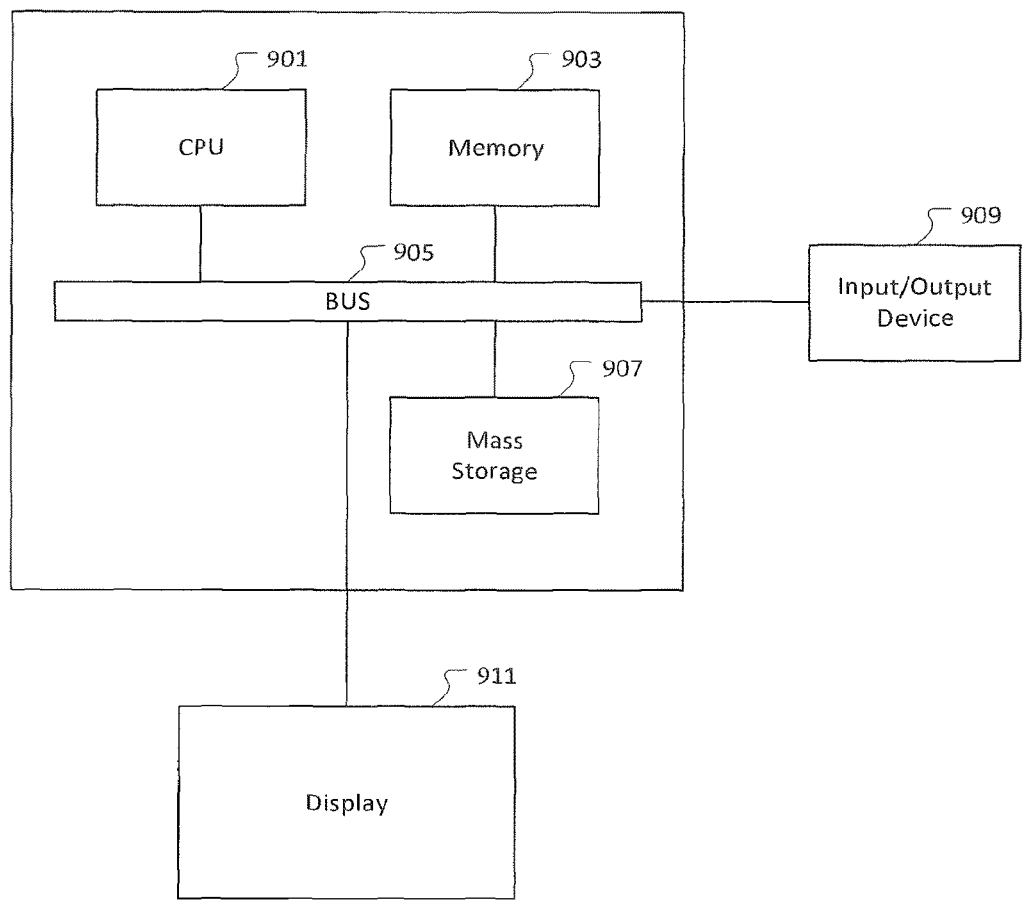
FIG. 9 is an illustration showing an exemplary computing device which may implement the embodiments described herein.

The methods described herein may be performed with a digital processing system, such as a conventional, general-purpose computer system. Special purpose computers, which are designed or programmed to perform only one function may be used in the alternative. FIG. 9 is an illustration showing an exemplary computing device which may implement the embodiments described herein. The computing device of FIG. 9 may be used to perform embodiments of the functionality for disaster recovery in accordance with some embodiments. The computing device includes a central processing unit (CPU) 901, which is coupled through a bus 905 to a memory 903, and mass storage device 907. Mass storage device 907 represents a persistent data storage device such as a disc drive, which may be local or remote in some embodiments. The mass storage device 907 could implement a backup storage, in some embodiments. Memory 903 may include read only memory, random access memory, etc. Applications resident on the computing device may be stored on or accessed via a computer readable medium such as memory 903 or mass storage device 907 in some embodiments. Applications may also be in the form of modulated electronic signals modulated accessed via a network modem or other network interface of the computing device. It should be appreciated that CPU 901 may be embodied in a general-purpose processor, a special purpose processor, or a specially programmed logic device in some embodiments.

Display 911 is in communication with CPU 901, memory 903, and mass storage device 907, through bus 905. Display 911 is configured to display any visualization tools or reports associated with the system described herein. Input/output device 709 is coupled to bus 905 in order to communicate information in command selections to CPU 901. It should be appreciated that data to and from external devices may be communicated through the input/output device 909. CPU 901 can be defined to execute the functionality described herein to enable the functionality described with reference to FIGS. 1-8. The code embodying this functionality may be stored within memory 903 or mass storage device 907 for execution by a processor such as CPU 901 in some embodiments. The operating system on the computing device may be MS-WINDOWS™, UNIX™, LINUX™, iOS™, CentOS™, Android™, Redhat Linux™, z/OS™, or other known operating systems. It should be appreciated that the embodiments described herein may be integrated with virtualized computing system also.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method of storing data, comprising:
receiving, from a client system, a request to store first data at a first storage cluster of the storage grid;
storing portions of the first data at a remaining set of storage clusters of the storage grid, responsive to the receiving;
repeating the receiving and the storing with a second data, such that no one storage cluster of the storage grid has a full copy of the first data and a full copy of the second data, and in the case of removal of any storage cluster from the storage grid, a combination of remaining storage clusters may recover the full copy of the first data and the full copy of the second data; and
recovering the first data from the remaining set of storage clusters in response to a failure of the first storage cluster.

2. The method of claim 1, further comprising:
recovery of the full copy of the first data and the full copy of the second data includes recovering a key encrypting the full copy of the first data or the full copy of the second data from the combination of multiple remaining storage clusters.

3. The method of claim 1, further comprising:
splitting the first data into the portions, wherein the splitting is performed by one of the storage clusters of the storage grid or a network coupled to each of the storage clusters of the storage grid.

4. The method of claim 1, wherein the first data includes a first segment of data and a second segment of data, wherein a first portion of the portions of the first data includes the first segment of data, and a second portion of the portions of the first data includes the second segment of data.

5. The method of claim 1, wherein storing the portions of the first data at the remaining set of storage clusters includes writing alternating segments of first data to the remaining set of storage clusters.

6. The method of claim 1, wherein recovering the first data from the remaining set of storage clusters comprises interleaving the portions of the first data from the remaining set of storage clusters to recover a copy of the first data.

7. The method of claim 1, further comprising:
encrypting contents of each of the storage clusters via a shared secret; and
storing a first share of the shared secret at the first storage cluster and remaining shares of the shared secret at the remaining set of storage clusters, such that in the case that any share of the shared secret is unavailable, the combination of remaining storage clusters have shares that suffice for decrypting the contents of any of the storage clusters.

8. A storage grid, comprising:
a first storage cluster to store a copy of a first data and a portion of a second data;
a second storage cluster to store a copy of the second data and a portion of the first data; and
a plurality of remaining storage clusters other than the first storage cluster and the second storage cluster, each of the remaining storage clusters to store a portion of the first data and a portion of the second data; wherein no storage cluster in the storage grid has a full copy of the first data and a full copy of the second data, and the first data is recoverable from the remaining storage clusters and the second storage cluster.

9. The storage grid of claim 8, wherein:
the second data is recoverable from the remaining storage clusters and the first storage cluster.

10. The storage group of claim 8, further configured so that in the event of a failure of the first storage cluster, the first data can be recovered by interleaving portions of the first data, from the remaining storage clusters and the second storage cluster, the interleaving at a granularity of a segment.

11. The storage grid of claim 8, further comprising:
each of the first storage cluster, the second storage cluster, and the remaining storage clusters including flash.

12. The storage grid of claim 8, further comprising:
the first storage cluster, the second storage cluster, and the remaining storage clusters configured to couple to each other via a network and wherein each of the first storage cluster, the second storage cluster, and the remaining storage clusters have different storage capacities.

13. The storage grid of claim 8, further comprising:
a secret generation unit, configured to generate a shared secret applicable to encrypting keys;
a share generation unit, configured to generate shares of the shared secret; and
each of the first storage cluster, the second storage cluster and the remaining storage clusters configured to store one of the shares of the shared secret.

14. The storage grid of claim 8, further comprising:
each of the first storage cluster, the second storage cluster and the remaining storage clusters includes a plurality of storage units with solid-state memory.

15. A storage grid comprising:
a first storage cluster configured to receive a first data from a client system, write the first data into the first storage cluster, send a portion of a copy of the first data to a second storage cluster, and send a remaining portion of the copy of the first data to a third storage cluster;
the second storage cluster configured to receive a second data from the client system, write the second data into the second storage cluster, send a portion of a copy of the second data to the third storage cluster, and send a remaining portion of the copy of the second data to the first storage cluster; and
a plurality of remaining storage clusters other than the first storage cluster and the second storage cluster, wherein responsive to repeated storing of data and portions of copies of the data no one storage cluster of the storage grid has a full copy of the first data and a full copy of the second data, and any user data received and stored at the storage grid is recoverable from multiple combinations of storage clusters in the storage grid.

16. The storage grid of claim 15, wherein:
the first storage cluster lacks a full copy of the first data, the second data and the third data;
the second storage cluster lacks a full copy of the first data, the second data and the third data;
the third storage cluster lacks a full copy of the first data, the second data and the third data; and wherein any combination of two clusters of the first storage cluster, the second storage cluster, and the third storage cluster can recover the first data, the second data and the third data.

17. The storage grid of claim 15, wherein the first storage cluster is configured to send the portion of the copy of the first data and the remaining portion of the copy of the first data as alternating segments of data to the third storage cluster and the second storage cluster.

18. The storage grid of claim 15, further comprising:
at least one processor configured to generate a shared secret and shares of the shared secret;
each of the first storage cluster, the second storage cluster, and the third storage cluster configured to store at least one of the shares of the shared secret, wherein shares of the shared secret from two of the first storage cluster, the second storage cluster, and the third storage cluster are applicable to decrypt data on any one of the first storage cluster, the second storage cluster, or the third storage cluster.

19. The storage grid of claim 15, wherein the first data, the second data and the third data is portioned by one of the storage clusters of the storage grid or a network coupled to each of the storage clusters of the storage grid.

20. The storage grid of claim 15, further comprising:
the second storage cluster and the third storage cluster configured to recover the first data by combining the portion of the copy of the first data from the second storage cluster and the remaining portion of the copy of the first data from the third storage cluster; and
the third storage cluster and the first storage cluster configured to recover the second data by combining the portion of the copy of the second data from the third storage cluster and the remaining portion of the copy of the second data from the first storage cluster.

* * * * *